US011183889B2

(12) United States Patent
Pan et al.

(10) Patent No.: US 11,183,889 B2
(45) Date of Patent: Nov. 23, 2021

(54) METHOD AND DEVICE FOR WIRELESS CHARGING, WIRELESS CHARGING TRANSMITTER AND STORAGE MEDIUM

(71) Applicant: BEIJING XIAOMI MOBILE SOFTWARE CO., LTD., Beijing (CN)

(72) Inventors: Yajun Pan, Beijing (CN); Shujun Wei, Beijing (CN); Jian Bai, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/826,453

(22) Filed: Mar. 23, 2020

(65) Prior Publication Data
US 2021/0135509 A1    May 6, 2021

(30) Foreign Application Priority Data
Nov. 4, 2019 (CN) .......................... 201911067303.4

(51) Int. Cl.
| H02J 7/00 | (2006.01) |
| H02J 7/02 | (2016.01) |
| H02J 50/12 | (2016.01) |
| H02J 50/80 | (2016.01) |
| H02J 50/90 | (2016.01) |
| H02J 50/20 | (2016.01) |

(52) U.S. Cl.
CPC .............. *H02J 50/90* (2016.02); *H02J 50/12* (2016.02); *H02J 50/20* (2016.02); *H02J 50/80* (2016.02)

(58) Field of Classification Search
None
See application file for complete search history.

(56) References Cited

U.S. PATENT DOCUMENTS

| 9,692,487 | B2* | 6/2017 | Jung | H02J 50/12 |
| 9,800,061 | B2* | 10/2017 | Takahashi | H02J 50/80 |
| 9,866,059 | B2* | 1/2018 | Niizuma | H02J 5/005 |
| 9,893,535 | B2* | 2/2018 | Leabman | H02J 7/025 |
| 10,336,204 | B2* | 7/2019 | Chabaan | B60L 53/38 |
| 10,399,448 | B2* | 9/2019 | Seong | B60L 53/39 |
| 10,439,450 | B2* | 10/2019 | Lee | H04W 8/005 |
| 10,541,570 | B2* | 1/2020 | Shimokawa | H04B 5/0081 |
| 10,615,613 | B2* | 4/2020 | Calhoun | H02J 50/80 |
| 10,756,559 | B2* | 8/2020 | Ikefuji | H02J 7/025 |

(Continued)

FOREIGN PATENT DOCUMENTS

| CN | 108512281 A | 9/2018 |
| CN | 109217483 A | 1/2019 |

OTHER PUBLICATIONS

European Search Report in the European application No. 20169155.7, dated Jun. 5, 2020.

*Primary Examiner* — Kenneth B Wells
(74) *Attorney, Agent, or Firm* — Syncoda LLC; Feng Ma

(57) ABSTRACT

A method for wireless charging includes: position-orientation information of a terminal for wireless charging based on a radio frequency signal transmitted by the wireless charging transmitter is acquired; whether the terminal is in a target charging state is determined based on the position-orientation information; and responsive to that it is determined that the terminal is not in the target charging state, first prompting information is output, and the first prompting information is used to prompt an adjustment of the position-orientation information of the terminal.

17 Claims, 8 Drawing Sheets

(56) References Cited

U.S. PATENT DOCUMENTS

| | | |
|---|---|---|
| 2010/0176934 A1 | 7/2010 | Chou |
| 2014/0306646 A1 | 10/2014 | Liu |
| 2017/0338682 A1 | 11/2017 | Yuan et al. |
| 2019/0319496 A1 | 10/2019 | Wang et al. |

* cited by examiner

METHOD AND DEVICE FOR WIRELESS CHARGING, WIRELESS CHARGING TRANSMITTER AND STORAGE MEDIUM

CROSS-REFERENCE TO RELATED APPLICATION

This application claims priority to Chinese patent application No. 201911067303.4 filed on Nov. 4, 2019, the disclosure of which is hereby incorporated by reference in its entirety.

BACKGROUND

Typically, an electromagnetic-induction-based Wireless Power Consortium (SPC) standard and a magnetic resonance technology-based AirFuel Alliance (AFA) standard are adopted for mainstream wireless charging solutions. The AFA standard is a standard established by the AFA. Since a technology maturity of the AFA standard is too low to meet a commercial requirement, the WPC standard is adopted for all wireless charging solutions on the present market.

SUMMARY

The present disclosure generally relates to the technical field of wireless charging, and more specifically to a method and a device for wireless charging, a wireless charging transmitter and a storage medium.

According to a first aspect of embodiments of the present disclosure, there is provided a method for wireless charging, which may be applied to a wireless charging transmitter and include that:

position-orientation information of a terminal for wireless charging based on a radio frequency signal transmitted by the wireless charging transmitter is acquired;

whether the terminal is in a target charging state is determined based on the position-orientation information; and responsive to determining that the terminal is not in the target charging state, first prompting information is output, herein the first prompting information is used to prompt an adjustment of the position-orientation information of the terminal.

According to a second aspect of the embodiments of the present disclosure, there is provided a device for wireless charging, which may include:

a processor; and a memory configured to store processor-executable instructions, wherein the processor is configured to:

acquire position-orientation information of a terminal for wireless charging based on a radio frequency signal transmitted by a wireless charging transmitter;

determine, based on the position-orientation information, whether the terminal is in a target charging state; and responsive to determining that the terminal is not in the target charging state, output first prompting information, wherein the first prompting information is used to prompt an adjustment of the position-orientation information of the terminal.

According to a third aspect of the embodiments of the present disclosure, there is provided a non-transitory computer-readable storage medium having stored therein an executable program that when being executed by a processor, implement the method for wireless charging, and the method includes that:

position-orientation information of a terminal for wireless charging based on a radio frequency signal transmitted by the wireless charging transmitter is acquired;

whether the terminal is in a target charging state is determined based on the position-orientation information; and responsive to determining that the terminal is not in the target charging state, first prompting information is output, wherein the first prompting information is used to prompt an adjustment of the position-orientation information of the terminal.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
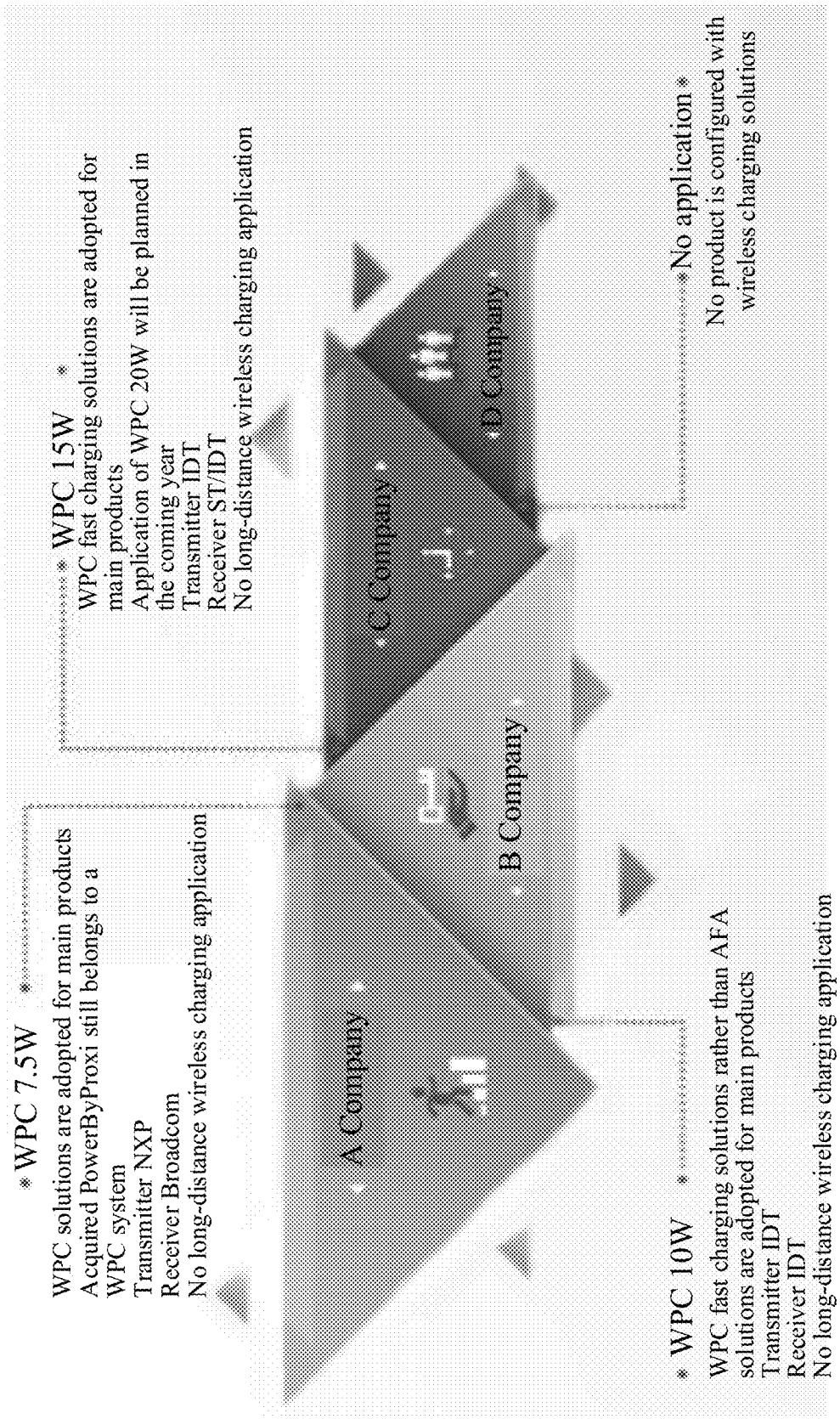
FIG. 1 illustrates wireless charging solutions for products of various mobile phones.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

FIG. 1 illustrates wireless charging solutions for products of various mobile phone manufacturers (company A, company B, company C and company D). The wireless charging solutions of the mainstream mobile phone manufacturers are generally WPC solutions and applied to short-distance wireless charging within 5 mm between a transmitting device and a receiving device. With increasing extension of Internet of everything scenarios, long-distance wireless charging solutions may be desired. Various embodiments of the present disclosure can improve charging efficiency in the environment of remarkable improvement of the degree of freedom of long-distance wireless charging.

Figure 2:
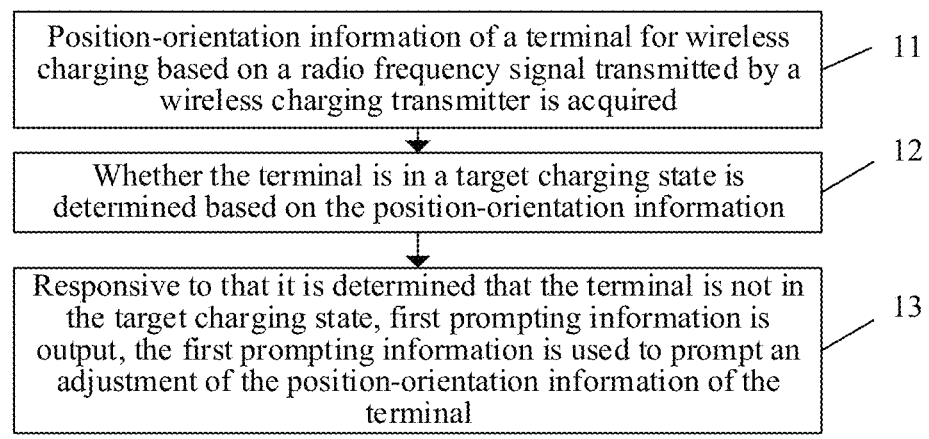
FIG. 2 is a flowchart showing a method for wireless charging, according to some embodiments of the present disclosure.

FIG. 2 is a flowchart showing a method for wireless charging, according to some embodiments of the present disclosure. As shown in FIG. 2, the method for wireless charging is applied to a wireless charging transmitter and includes the following blocks.

In block 11, position-orientation information of a terminal for wireless charging based on a radio frequency signal transmitted by the wireless charging transmitter is acquired.

In block 12, whether the terminal is in a target charging state is determined based on the position-orientation information.

In block 13, responsive to determining that the terminal is not in the target charging state, first prompting information is output, and the first prompting information is used to prompt an adjustment of the position-orientation information of the terminal.

In some embodiments of the present disclosure, the wireless charging transmitter may be any electronic device capable of transmitting a radio frequency signal. The terminal may be any electronic device capable of receiving a radio frequency signal. For example, the terminal may be a mobile communication device, a Bluetooth earphone, a smart watch or band, or a notebook computer, etc.

Herein, the position-orientation information includes position information and/or orientation information.

Herein, the position information may be a distance between the terminal and the wireless charging transmitter, or the position information may also be a space distribution of the terminal. For example, in an office, a terminal is 5 m away from a door and 3 m away from a window.

The orientation information may be that the terminal is lying flat, vertical or at a certain angle with respect to the horizontal plane, or the orientation information may also be orientation information or direction information of the terminal. For example, the terminal faces 45° southwest. For another example, the terminal faces a direction opposite to a direction in which the wireless charging transmitter transmits the radio frequency signal. In other words, an angle between the terminal and a transmitting direction of the radio frequency signal may be determined based on the position-orientation information.

Figure 3:
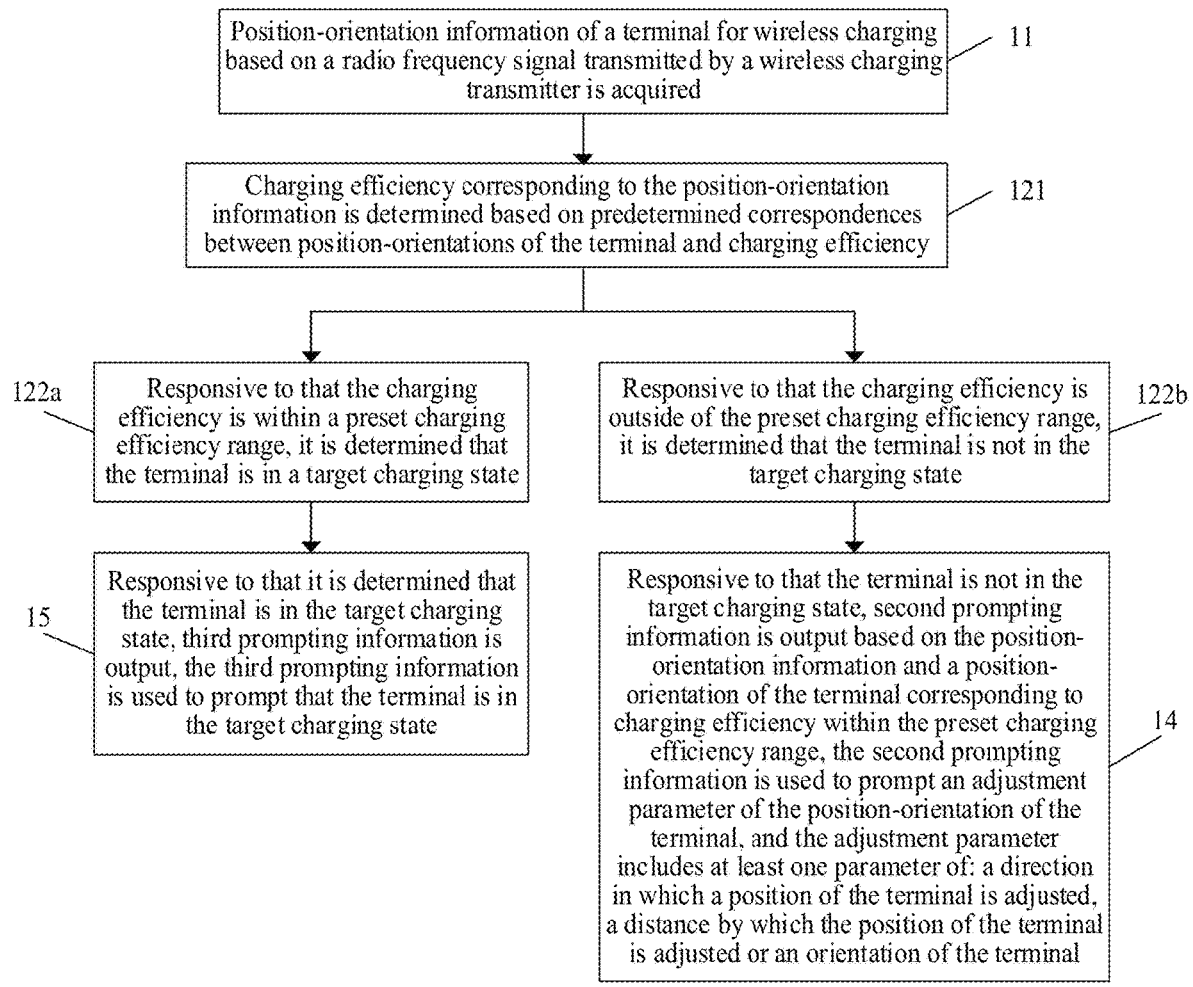
FIG. 3 is a flowchart showing another method for wireless charging, according to some embodiments of the present disclosure.

In some embodiments, as shown in FIG. 3, block 12 includes the following blocks.

In block 121, charging efficiency corresponding to the position-orientation information is determined based on predetermined correspondences between position-orientations of the terminal and charging efficiencies.

In block 122a, responsive to the charging efficiency being within a preset charging efficiency range, it is determined that the terminal is in the target charging state.

In block 122b, responsive to the charging efficiency being outside of the preset charging efficiency range, it is determined that the terminal is not in the target charging state.

Herein, the correspondences between the position-orientations of the terminal and the charging efficiencies may be in the form of a table or a list, or may be in the form of an array, etc. In a practical application, the position-orientation information includes a distance and an angle. Herein, specific implementation of the correspondences is only required to meet such a form that {distance, angle} corresponds to charging efficiency one to one, and there are no limits made herein.

For example, Table 1 provides the correspondences between the position-orientations of the terminal and charging efficiencies. The correspondences are in table form. Distances in each position-orientation information of the terminal include $D_1, D_2, D_3, \ldots, D_n$, and angles in each position-orientation information of the terminal include $\theta_1, \theta_2, \theta_3, \ldots, \theta_n$. The position-orientation information $(D_1, \theta_1), (D_1, \theta_2), \ldots, (D_1, \theta_n), (D_2, \theta_1), \ldots, (D_2, \theta_2), \ldots, (D_2, \theta_n), (D_3, \theta_1), \ldots, (D_n, \theta_n)$ of the terminal correspond to charging efficiency $P_{11}, P_{12}, \ldots, P_{1n}, P_{21}, P_{22}, \ldots, P_{2n}, P_{31}, \ldots, P_{nn}$ respectively, specifically as shown in Table 1.

TABLE 1

| | D | | | | |
|---|---|---|---|---|---|
| $\theta$ | $D_1$ | $D_2$ | $D_3$ | $\ldots$ | $D_n$ |
| $\theta_1$ | $P_{11}$ | $P_{12}$ | $P_{13}$ | $\ldots$ | $P_{1n}$ |
| $\theta_2$ | $P_{21}$ | $P_{22}$ | $P_{23}$ | $\ldots$ | $P_{2n}$ |
| $\theta_3$ | $P_{31}$ | $P_{32}$ | $P_{33}$ | $\ldots$ | $P_{3n}$ |
| $\ldots$ | $\ldots$ | $\ldots$ | $\ldots$ | $\ldots$ | $\ldots$ |
| $\theta_n$ | $P_{n1}$ | $P_{n2}$ | $P_{n3}$ | $\ldots$ | $P_{nn}$ |

Herein, preset charging efficiency may be charging efficiency greater than or equal to a second threshold value.

For example, if the second threshold value is 30%, the preset charging efficiency is a value greater than or equal to 30%. When it is obtained by querying based on the correspondences that present charging efficiency corresponding to the position-orientation of the terminal is greater than 30%, it is determined that the terminal is in the target charging state; and when it is obtained by querying that the present charging efficiency corresponding to the position-orientation of the terminal is less than 30%, it is determined that the terminal is not in the target charging state.

Herein, the preset charging efficiency may be charging efficiency at a relatively high charging efficiency rank.

For example, if the charging efficiency is 0% to 60%, the preset charging efficiency may be 55% to 60%.

Accordingly, in some embodiments, the correspondences between the position-orientations of the terminal and charging efficiencies may be established in advance; the present charging efficiency corresponding to the position-orientation information is determined based on the acquired position-orientation information of the terminal and the correspondences; whether the present charging efficiency is charging efficiency corresponding to the target charging state is determined, if the present charging efficiency is charging efficiency corresponding to the target charging state, it is determined that the terminal is in the target charging state, and if the present charging efficiency is not charging efficiency corresponding to the target charging state, it is determined that the terminal is not in the target charging state. Therefore, whether the terminal is in the relatively ideal target charging state may be accurately determined based on the correspondences. Moreover, such a manner is simple and easy to implement.

In some embodiments, block 122b includes that:
responsive to the charging efficiency being maximum charging efficiency in the correspondences, it is determined that the terminal is in the target charging state.

For example, if the charging efficiency in the correspondences is 0% to 60%, the maximum charging efficiency is 60%.

In some embodiments, each charging efficiency in the correspondences may be compared to determine the maximum charging efficiency. Then, the present charging efficiency corresponding to the position-orientation information of the terminal is queried based on the correspondences. If it is determined that the charging efficiency is the maximum charging efficiency, it is determined that the terminal is in the target charging state, and if NO, it is determined that the terminal is not in the target charging state. Therefore, in some embodiments, the more ideal target charging state of the terminal is further determined to further improve charging efficiency of the terminal when the position-orientation of the terminal is subsequently adjusted based on position-orientation information corresponding to the maximum charging efficiency.

Herein, in an implementation of block 13, if it is determined that the terminal is not in the target charging state, the first prompting information is displayed on a display screen of the wireless charging transmitter. For example, prompting information such as "the terminal is not in the target charging state, please timely adjust the position-orientation information of the terminal" is displayed on the display screen of the wireless charging transmitter.

In another implementation of block 13, if it is determined that the terminal is not in the target charging state, a first prompting voice is produced. Herein, the first prompting information includes the first prompting voice. Herein, a first voice module may be arranged in the wireless charging transmitter, and a prompting voice that "the terminal is not in the target charging state, please adjust the position-orientation information of the terminal" is produced based on the voice module.

In an embodiment, the method further includes that: the first prompting information is sent to the terminal, the first prompting information is used to be displayed by the terminal based on a display screen of the terminal. In such a manner, a user may timely see the prompting information and timely adjust the position-orientation of the terminal, so that the charging efficiency of the terminal is improved, and meanwhile, great convenience is brought to the user.

In some embodiments of the present disclosure, the position-orientation information of the terminal may be acquired; whether the terminal is in the target charging state is determined based on the position-orientation information; and if the terminal is not in the target charging state, prompting information for adjusting the position-orientation information of the terminal is output to prompt the user to adjust the position-orientation of the terminal, so that subsequent adjustment of the terminal to a proper position-orientation for meeting a requirement that the terminal is in the target charging state and improving charging efficiency of the terminal is facilitated.

Further, the charging efficiency corresponding to the position-orientation is determined via the predetermined correspondences between the position-orientations of the terminal and the charging efficiencies, and whether the terminal is in the target charging state is determined based on whether the charging efficiency is within the preset charging efficiency range, so that the ideal target charging state of the terminal may be accurately determined.

Furthermore, whether the charging efficiency is the maximum charging efficiency in the correspondences is determined to determine whether the terminal with the position-orientation information is in the target charging state, so that the more ideal charging state may further be determined to further improve the charging efficiency of the terminal when the position-orientation of the terminal is subsequently adjusted based on the position-orientation information corresponding to the maximum charging efficiency.

Whether the terminal is in the target charging state is determined via the position-orientation information, and if the terminal is not in the target charging state, the position-orientation of the terminal is changed to improve the charging efficiency. Such a manner is easy to operate and implement, and a user experience is also greatly improved.

Referring to FIG. 3 again, in some embodiments, the method further includes the following block.

In block 14, responsive to the terminal being not in the target charging state, second prompting information is output based on the position-orientation information and a position-orientation of the terminal corresponding to charging efficiency within the preset charging efficiency range, the second prompting information is used to prompt an adjustment parameter for adjusting the position-orientation of the terminal, and the adjustment parameter includes at least one parameter of: a direction in which a position of the terminal is adjusted, a distance by which the position of the terminal is adjusted or an orientation of the terminal.

Herein, charging efficiency corresponding to the target charging state may be the preset charging efficiency; or, the charging efficiency corresponding to the target charging state may also be the maximum charging efficiency in the correspondences.

Herein, a distance by which the position of the terminal is adjusted may be a distance corresponding to the preset charging efficiency. For example, in a practical application, a present position of the terminal is 7 m far away from the wireless charging transmitter, and the distance corresponding to the preset charging efficiency is 5 m to 6 m far away from the wireless charging transmitter. In such case, a distance by which the position of the terminal is adjusted may be 1 m to 2 m.

Herein, a distance by which the position of the terminal is adjusted may be a distance corresponding to the maximum charging efficiency. For example, in a practical application, the present position of the terminal is 7 m far away from the wireless charging transmitter, and the distance corresponding to the maximum charging efficiency is 5.5 m far away from the wireless charging transmitter. In such case, a distance by which the position of the terminal is adjusted can be 7−5.5=1.5 m.

It can be understood that the direction in which a position of the terminal is adjusted or the orientation of the position of the terminal may be considered as adjusting the angle of the terminal in a practical application. Orientation in which a position of the terminal is adjusted is adjusted based on a first angle, and a direction in which a position of the terminal is adjusted is adjusted based on a second angle, and the first angle is greater than the second angle.

Herein, an angle by which the terminal is adjusted may be the distance corresponding to the preset charging efficiency. For example, in a practical application, a present angle between the terminal and the radio frequency signal transmitted by the wireless charging transmitter is 10°, and an angle, corresponding to the preset charging efficiency, with the radio frequency signal transmitted by the wireless charging transmitter is 15° to 20°. In such case, an angle by which the terminal is adjusted is 5° to 10°.

Herein, the angle by which the terminal is adjusted may be the distance corresponding to the maximum charging efficiency. For example, in a practical application, the present angle between the terminal and the radio frequency signal transmitted by the wireless charging transmitter is 10°, and an angle, corresponding to the maximum charging efficiency, with transmission of the radio frequency signal by the wireless charging transmitter is 18°. In such case, an angle by which the terminal is adjusted is 8°.

Here, an implementation of the operation that the second prompting information is output is that: the second prompting information is displayed by use of the display screen of the wireless charging transmitter. For example, prompting information such as "the terminal is not in the target charging state, please adjust the terminal to be 1 m far away from the wireless charging transmitter" or "please adjust the terminal to be deflected 5° southwestwards" is displayed on the display screen.

Herein, another implementation of the operation that the second prompting information is output is that: a second prompting voice is produced. For example, a prompting voice such as "the terminal is not in the target charging state, please adjust the terminal to be 1 m far away from the wireless charging transmitter" or "please adjust the terminal to be deflected 5° southwestwards" is produced by use of the voice module of the wireless charging transmitter.

In some other embodiments, the method further includes that: the second prompting information is sent to the terminal. The second prompting information is displayed by the terminal based on the display screen of the terminal. Therefore, the user may conveniently see the adjustment parameter which is suggested to adjust position information of the terminal on the terminal, and great convenience is brought to operations of the user.

In some embodiments of the present disclosure, the difference between the position-orientation of the terminal corresponding to the charging efficiency within the preset charging efficiency range and the position-orientation information may be determined, and a prompt about adjustment of parameter information is made based on the difference, so that the user may favorably adjust the position-orientation of the terminal based on the prompting information. For example, the distance between the terminal and the wireless charging transmitter is adjusted, and/or the angle between the terminal and the radio frequency signal is adjusted, so that the position-orientation of the terminal may be adjusted from many aspects, and adjustment of the position-orientation of the terminal for meeting the requirement that the terminal is in the target charging state and improving the charging efficiency of the terminal is facilitated.

Referring to FIG. 3 again, in some other embodiments, the method further includes the following block.

In block 15, responsive to determining that the terminal is in the target charging state, third prompting information is output, and the third prompting information is used to prompt that the terminal is in the target charging state.

Herein, the operation that the third prompting information is output may also include at least one of the following operations: the third prompting information is displayed by use of the display screen of the wireless charging transmitter; and a third prompting voice is produced by use of the voice module of the wireless charging transmitter.

For example, prompting information such as "the terminal is in the target charging state" is displayed on the display screen of the wireless charging transmitter.

In some other embodiments, the method further includes that: the third prompting information is sent to the terminal, and the third prompting information is displayed by the terminal based on the display screen of the terminal. Therefore, the user may conveniently see the prompting information on the terminal.

In some embodiments of the present disclosure, responsive to determining that the terminal is in the target charging state, the third prompting information may be output to prompt the user that the terminal is charged at a relatively ideal position-orientation and the position-orientation of the terminal is not required to be adjusted.

In some embodiments, the method further includes that:
first receiving power returned by the terminal based on first transmitting power is received, and the first transmitting power is power at which the radio frequency signal is transmitted by the wireless charging transmitter;
first transmission efficiency is determined based on the first transmitting power and the first receiving power; and
responsive to determining that a difference between the first transmission efficiency and the maximum charging efficiency is less than a first threshold value, it is determined that the terminal is in the target charging state.

In some embodiments, the operation that: responsive to determining that the difference between the first transmission efficiency and the maximum charging efficiency is less than the first threshold value, it is determined that the terminal is in the target charging state, may be implemented as follows: responsive to determining that the first transmission efficiency is within the preset charging efficiency range, it is determined that the terminal is in the target charging state.

In some embodiments, the method further includes that:
responsive to determining that the difference between the first transmission efficiency and the maximum charging efficiency is greater than or equal to the first threshold value, it is determined that the terminal is not in the target charging state;
or,
responsive to determining that the first transmission efficiency is outside of the preset charging efficiency range, it is determined that the terminal is not in the target charging state.

In a practical application, it may be considered that charging efficiency calculated based on the position-orientation information in the abovementioned embodiments is the first transmission efficiency in some embodiments.

In some embodiments of the present disclosure, the first transmission efficiency may directly be compared with the preset charging efficiency to determine whether the terminal is in the target charging state. Another manner for determining the target charging state is provided, and the manner is simple and easy to implement.

Figure 4:
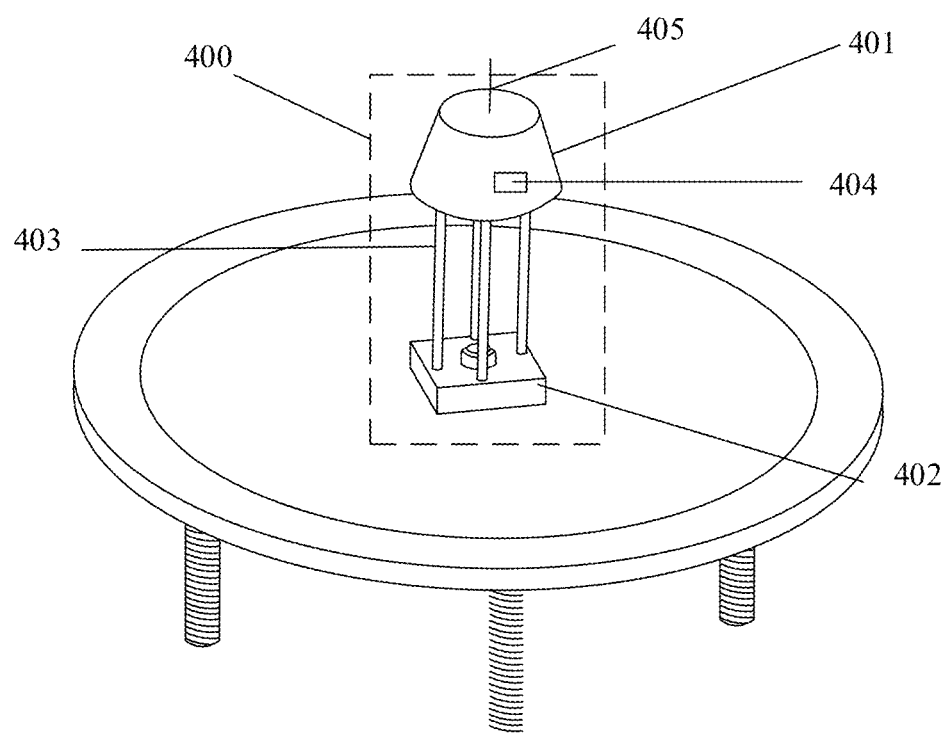
FIG. 4 is a block diagram of a wireless charging transmitter, according to some embodiments of the present disclosure.

In an example, as shown in FIG. 4, a block diagram of a wireless charging transmitter shaped like a desk lamp is provided. The wireless charging transmitter 400 includes: a supporting body 401, a display screen 404 and at least one first radio frequency antenna 405 which is placed on an outer surface of the supporting body;
a base 402, provided with a receiving cavity; and
support rods 403, one end of each support rod 403 being connected with the base 402 and the other end being connected with the supporting body 401, to support the supporting body 401.

In the example, the wireless charging transmitter may be designed into a state like a desk lamp, and then the wireless charging transmitter may be placed on a desk or an office table, etc. Therefore, a user may conveniently view data displayed on the display screen, and convenience is brought to the user. Moreover, in such a design of the wireless charging transmitter in the state like a desk lamp, a light-emitting component may further be arranged in the wireless charging transmitter, thereby endowing the wireless charging transmitter with a basic function of a desk lamp.

Of course, in some embodiments, the wireless charging transmitter may be placed at any other position, for example, placed on a ceiling of an office or suspended on a door.

Figure 5:
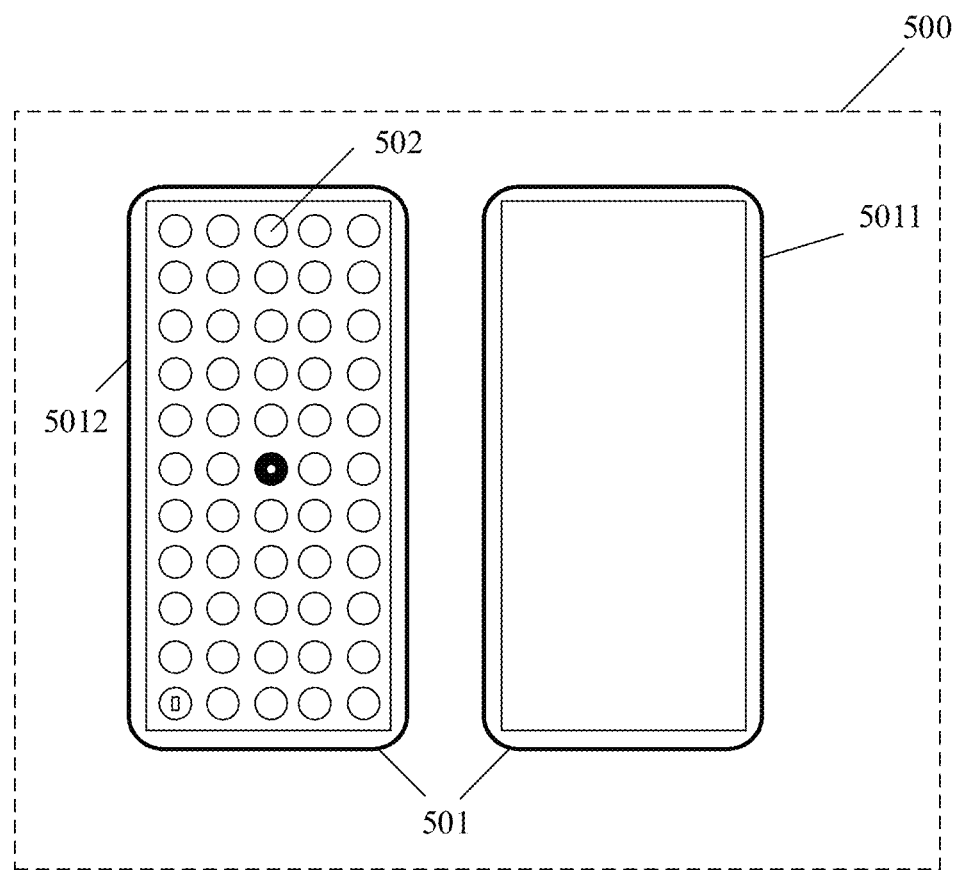
FIG. 5 is a block diagram of a terminal, according to some embodiments of the present disclosure.

In an example, as shown in FIG. 5, a block diagram of a terminal is provided. The terminal 500 includes:

a housing 501, including a front housing 5011 and a rear housing 5012; and at least one second radio frequency antenna 502, positioned on an outer surface of the rear housing 5012.

In some embodiments of the present disclosure, for avoiding influence on a screen-to-body ratio of a screen of the terminal, the at least one second radio frequency antenna 502 may be arranged on the rear housing 5012 of the mobile phone and may specifically be arranged on the outer surface of the rear housing 5012.

In the example, the at least one second radio frequency antenna 502 may be arranged in the form of an antenna array. Therefore, a size and a direction of a radiation field are changed in the form of the antenna array to maximally receive a radio frequency signal.

In the example, the at least one second radio frequency antenna 502 is arranged on the outer surface of the rear housing 5012, so that the influence on the screen-to-body ratio of the screen of the terminal may be avoided; and moreover, the at least one second radio frequency antenna 502 is arranged on the outer surface of the rear housing 5012, so that influence on reception of the radio frequency signal may be avoided no matter which material the housing of the terminal is made of.

In a practical application, for overall charging efficiency of a terminal, besides the abovementioned first transmitting power, internal power conversion conditions of a wireless charging transmitter and the terminal may further be considered. A charging efficiency calculation method for a wireless charging system is also provided below. The overall charging efficiency is determined based on first transmission efficiency of a transceiver antenna, second transmission efficiency of the wireless charging transmitter and third transmission efficiency of the terminal. The calculation method for the overall charging efficiency includes the following blocks.

In (1), the first transmission efficiency of the transceiver antenna is calculated.

Herein, the first transmission efficiency is transmission efficiency between the wireless charging transmitter and the terminal. Specifically, based on a corrected Friis transmission formula, the first transmission efficiency can be $$\eta_{T-R} = \frac{G_t G_r \lambda^2}{(4\pi D)^2} \times L_t \times G_r(\theta_r, \varphi_r),$$

where $G_t$ is a transmitting gain of the wireless charging transmitter, $G_r$ is a receiving gain of the terminal, $\lambda$ is a wavelength, D is a transmission distance, the transmission distance is a distance between the wireless charging transmitter and the terminal, $L_t$ is joint is loss of wireless connection, and $G_r(\theta_r, \varphi_r)$ is loss produced by an alignment error of a receiving node.

It is to be noted that, when the distance between the wireless charging transmitter and the terminal is 0.707 m to 1.082 m, wireless charging is implemented in a near field region.

In an example, if the terminal is positioned at a horizontal radius 0.5 m, namely the distance between the wireless charging transmitter and the terminal is D=0.707 m, $G_t$ and $G_r$ are 26.4 dBi and 20.65 dBi, $\lambda$ is 0.03125 m, $L_t$ is 0.3 dB, the loss $G_r(\theta_r, \varphi_r)$ produced by the alignment error of the receiving node is 0.2, and $\eta_{T-R}$=55.9% is calculated.

Therefore, when the terminal is positioned at the horizontal radius 0.5 m, optimal transmission efficiency between a first transmitting antenna of the wireless charging transmitter and a second transmitting antenna of the terminal is 55.9%.

In (2), the second transmission efficiency of the wireless charging transmitter is calculated.

Herein, the second transmission efficiency is overall efficiency of a transmitting channel of the wireless charging transmitter. Specifically, the second transmission efficiency is $$\eta_{DC-MW} = \frac{P_T}{P_{DIS}},$$

where $P_T$ is total output power of the phased array transmitting channel, and $P_{DIS}$ is total direct current power consumption of the phased array transmitting channel.

In an example, $P_{DIS}$ is calculated as follows.

Positive voltage (drain voltage) power consumption of power amplifiers of 24 transmitting channel modules is considered. Specifically, a 6-path transmitting channel module includes 6 power amplifier chips. If the power amplifier chip is WFD090100-P28, the power amplifier chip is powered based on a +8V voltage and additional efficiency of the power amplifier chip is about 43%, it may be calculated that power consumption of each chip is about 1.68 W and a current is about 0.21 A, and power consumption of each 6-path transmitting channel module is about 1.68 W×6=10.08 W. Therefore, total power consumption of the 24 transmitting channel modules is about 10.08 W×24=241.92 W. If a maximum duty ratio of the transmitting channel module during work is 45%, practical power consumption of the 24 transmitting channel modules is 241.92 W×45%=108.86 W.

Positive voltage (drain voltage) power consumption of 2 power amplifier network modules is considered. Specifically, a power amplifier network module includes 6 power amplifier chips WFD090100-P28HMC451 and a driving and power amplifier chip HMC451. It may be calculated that power consumption of the driving and power amplifier chip HMC451 is 8V*120 mA=0.96 W. Therefore, power consumption of a power amplifier network module is 10.08+0.96 W=11.04 W, and power consumption of the 2 power amplifier network modules is 11.04 W×2=22.08 W. If a maximum duty ratio of the power amplifier network module during work is 45%, practical power consumption of the 2 power amplifier network modules is 22.08 W×40%=9.936 W.

Power consumption of a frequency source power divider module and a power amplifier negative voltage module is considered. Specifically, a current of the frequency source power divider module is about 35 mA+350 mA+65 mA=450 mA, and in such case, total power consumption of the frequency source power divider module is about 450 mA×8V=3.6 W. If the power amplifier negative voltage module includes 156 power amplifier chips, and each power amplifier chip is supplied based on a −5V voltage and a 5 mA current, it is calculated that total power consumption of the power amplifier negative voltage module is 5V×5 mA×156=3.9 W. If efficiency of the power amplifier chip is 80%, practical power consumption of the power amplifier negative voltage module is 3.9 W/0.8=4.875 W.

It is calculated that $P_{DIS}$ under the duty ratio of 45% is 108.86 W+9.936 W+4.875 W=123.671 W.

Considering that a practical output voltage of a low-frequency power line is 8.2V and conversion efficiency is 8V/8.2V=97.56%, $P_{DIS}$ is practically 123.671 W/97.56%=126.764 W.

$P_T$ is calculated as follows.

Output of a single-channel power amplifier is 28.7 dBm, and considering power reduction caused by joint loss, other loss and temperature rises, the output at a normal temperature is 28 dBm (0.63 W).

It is calculated that $P_T$ under the duty ratio of 45% is 0.63 W×144×45%=40.82 W.

It is calculated that the second transmission efficiency under the duty ratio of 45% is $\eta_{DC\text{-}MW}$=0.63 W×144×45%/126.764 W=32.21%.

In (3), the third transmission efficiency of the terminal is calculated.

Herein, the third transmission efficiency is conversion efficiency of a rectified current of the terminal. Specifically, the third transmission efficiency is $$\eta_{MW-DC} = \frac{P_{DC}}{P_{MW}},$$

where $P_{DC}$ is output power of a rectifier circuit, and $P_{MW}$ is input power consumption of the rectifier circuit.

If a ratio of the output power to input power of the rectifier circuit is 40%, $$\eta_{MW-DC} = \frac{P_{DC}}{P_{MW}} = 40\%$$

is calculated.

Through the operations of (1), (2) and (3), the overall charging efficiency of the whole wireless charging transmitter-terminal system may be calculated to be $\eta_{ALL}=\eta_{DC\text{-}MW}\cdot\eta_{T\text{-}R}\cdot\eta_{MW\text{-}DC}$=32.21%×55.9%×40%=7.2%.

It can be understood that the first transmission efficiency is practically determined based on position-orientation information (including a distance with the wireless charging transmitter and an angle of the terminal) of the terminal, and is the charging efficiency in the abovementioned embodiment. In another embodiment, if the charging efficiency of the terminal is further required to be improved, the second transmission efficiency and/or the third transmission efficiency may also be changed. For example, at least one of the total output power of the phased array transmitting channel and the output power of the rectifier circuit may be improved. There are no limits made herein.

Example 1

Figure 6:
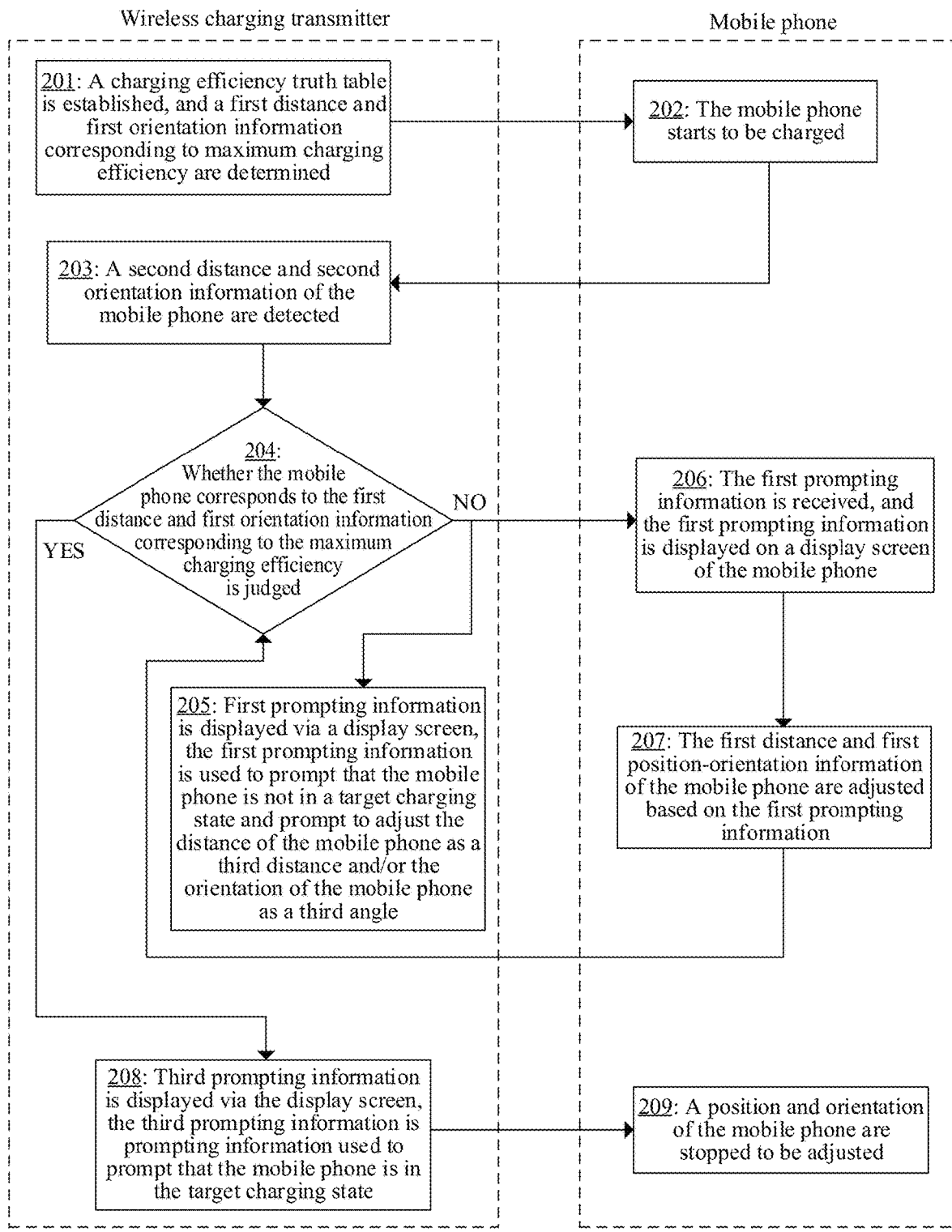
FIG. 6 is a flowchart showing another method for wireless charging, according to some embodiments of the present disclosure.

FIG. 6 is a flowchart showing a method for wireless charging, according to some embodiments of the present disclosure. As shown in FIG. 6, the method for wireless charging is applied to a wireless charging system, the wireless charging system including a wireless charging transmitter and a mobile phone. The method includes the following blocks.

In block 201, a charging efficiency truth table is established, and a first distance and first orientation information corresponding to maximum charging efficiency are determined.

In some embodiments, the wireless charging transmitter establishes the charging efficiency truth table based on each position-orientation of the terminal and corresponding charging efficiency, and determines the first distance and first orientation information corresponding to the maximum charging efficiency based on the charging efficiency truth table.

Herein, in an embodiment, the charging efficiency corresponding to each position-orientation of the terminal may be determined based on the first transmission efficiency $$\eta_{T-R} = \frac{G_t G_r \lambda^2}{(4\pi D)^2} \times L_t \times G_r(\theta_r \varphi_r)$$

in the abovementioned embodiment.

In block 202, the mobile phone starts to be charged.

In block 203, a second distance and second orientation information of the mobile phone are detected.

In some embodiments, the wireless charging transmitter detects the second distance and second orientation information of the mobile phone.

Herein, the second distance and the second orientation information may be determined based on position information, received by the wireless charging transmitter, of the terminal.

In block 204, whether the mobile phone corresponds to the first distance and first orientation information corresponding to the maximum charging efficiency is judged.

In some embodiments, the wireless charging transmitter compares the first distance and the second distance to determine whether the second distance is the same as the first distance, and compares the first orientation information and the second orientation information to determine whether the second orientation information is the same as the first orientation information.

In some embodiments, if the first distance is different from the second distance, a distance parameter for adjusting is determined based on the first distance and the second distance; and/or, if the first orientation information is different from the second orientation information, an angle parameter for adjusting is determined based on the first orientation information and the second orientation information.

In block 205, first prompting information is displayed via a display screen, the first prompting information is used to prompt that the mobile phone is not in a target charging state and prompt to adjust the distance of the mobile phone as a third distance and/or an orientation of the mobile phone as a third angle.

In some embodiments, the wireless charging transmitter displays the first prompting information via the display screen, the first prompting information is used to prompt that the mobile phone is not in the target charging state and suggest to adjust the distance of the mobile phone as the third distance and/or the orientation of the mobile phone as the third angle.

In block 206, the first prompting information is received, and the first prompting information is displayed on a display screen of the mobile phone.

In some embodiments, the mobile phone receives the first prompting information and displays the first prompting information on the display screen of the mobile phone. Specifically, prompting information that "the mobile phone is not in the target charging state, and it is suggested to adjust the distance of the mobile phone as the third distance and/or the orientation of the mobile phone as the third angle" is displayed.

In block 207, the first distance and first position-orientation information of the mobile phone are adjusted based on the first prompting information.

Herein, a user may adjust the first distance and first orientation information of the mobile phone based on the first prompting information in block 207. Specifically, the distance of the mobile phone is adjusted by the third distance to reach the first distance, and orientation information of the mobile phone is adjusted by the third angle to achieve an orientation corresponding to the first orientation information.

In block 208, third prompting information is displayed via the display screen, the third prompting information is prompting information used to prompt that the mobile phone is in the target charging state.

In some embodiments, the wireless charging transmitter displays the third prompting information that the mobile phone is in the target charging state via the display screen of the wireless charging transmitter.

In block 209, a position and orientation of the mobile phone are stopped being adjusted.

In some embodiments of the present disclosure, the charging efficiency truth table is established, the distance and orientation corresponding to the maximum charging efficiency are determined, whether the mobile phone is in the target charging state is determined based on whether a present distance and orientation for charging of the mobile phone are the distance and orientation corresponding to the maximum charging efficiency, and if NO, the distance and orientation of the mobile phone are adjusted to the distance and orientation corresponding to the maximum charging efficiency, so that charging efficiency of the mobile phone is improved.

The distance and orientation of the terminal are changed to improve the charging efficiency. Such a manner is easy to operate and implement, and a user experience is also greatly improved.

Figure 7:
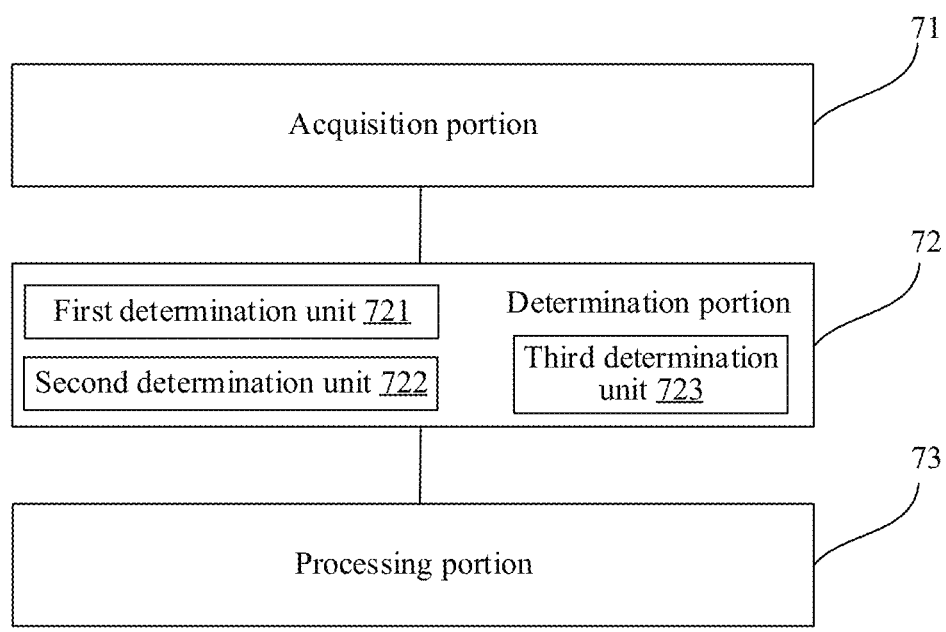
FIG. 7 is a block diagram of a device for wireless charging, according to some embodiments of the present disclosure.

FIG. 7 is a block diagram of a device for wireless charging, according to an example. Referring to FIG. 7, the device includes:

an acquisition portion 71, configured to acquire position-orientation information of a terminal for wireless charging based on a radio frequency signal transmitted by a wireless charging transmitter;

a determination portion 72, configured to determine, based on the position-orientation information, whether the terminal is in a target charging state; and a processing portion 73, configured to, responsive to determining that the terminal is not in the target charging state, output first prompting information, the first prompting information is used to prompt an adjustment of the position-orientation information of the terminal.

In some embodiments, the determination portion 72 includes:

a first determination unit 721, configured to determine, based on predetermined correspondences between position-orientations of the terminal and charging efficiency, charging efficiency corresponding to the position-orientation information; and a second determination unit 722, configured to, responsive to the charging efficiency being within a preset charging efficiency range, determine that the terminal is in the target charging state and, responsive to the charging efficiency being outside of the preset charging efficiency range, determine that the terminal is not in the target charging state.

In some embodiments, the second determination unit 722 is configured to, responsive to the charging efficiency being maximum charging efficiency in the correspondences, determine that the terminal is in the target charging state.

In some embodiments, the processing portion 73 is further configured to, responsive to that the terminal is not in the target charging state, output second prompting information based the position-orientation information and a position-orientation of the terminal corresponding to charging efficiency within the preset charging efficiency range, the second prompting information is used to prompt an adjustment parameter for adjusting the position-orientation of the terminal and the adjustment parameter includes at least one parameter of: a direction in which a position of the terminal is adjusted, a distance by which the position of the terminal is adjusted or an orientation of the terminal.

In some embodiments, the processing portion 73 is configured to, responsive to determining that the terminal is in the target charging state, output third prompting information, and the third prompting information is used to prompt that the terminal is in the target charging state.

In some embodiments, the acquisition portion 71 is configured to receive first receiving power returned by the terminal based on first transmitting power, and the first transmitting power is power at which the radio frequency signal is transmitted by the wireless charging transmitter; and the determination portion 72 further includes:

a third determination unit 723, configured to determine first transmission efficiency based on the first transmitting power and the first receiving power, and a second determination unit 722, responsive to determining that a difference between the first transmission efficiency and the maximum charging efficiency is less than a first threshold value, determine that the terminal is in the target charging state.

With respect to the device in the above embodiment, the specific manners for performing operations for individual portions therein have been described in detail in some embodiments regarding the method, which will not be elaborated herein.

An embodiment of the present disclosure also provides a wireless charging transmitter, which includes: a processor; and a memory configured to store processor-executable instructions, wherein the processor is configured to run computer service to implement the charging method of any above-mentioned embodiment.

The memory may include any type of storage medium, and the storage medium is a non-transitory computer storage medium and may keep information in a communication device after a power failure of the communication device.

The processor may be connected with the memory through a bus and the like, and is configured to read an executable program stored in the memory to implement, for example, at least one of the methods shown in FIG. 2, FIG. 3 and FIG. 6.

An embodiment of the present disclosure also provides a non-transitory computer-readable storage medium having stored therein an executable program that when being executed by a processor, implement the method for wireless charging of any abovementioned embodiment, for example, implementing at least one of the methods shown in FIG. 2, FIG. 3 and FIG. 6.

With respect to the device in the above embodiment, the specific manners for performing operations for individual portions therein have been described in detail in some embodiments regarding the method, which will not be elaborated herein.

Figure 8:
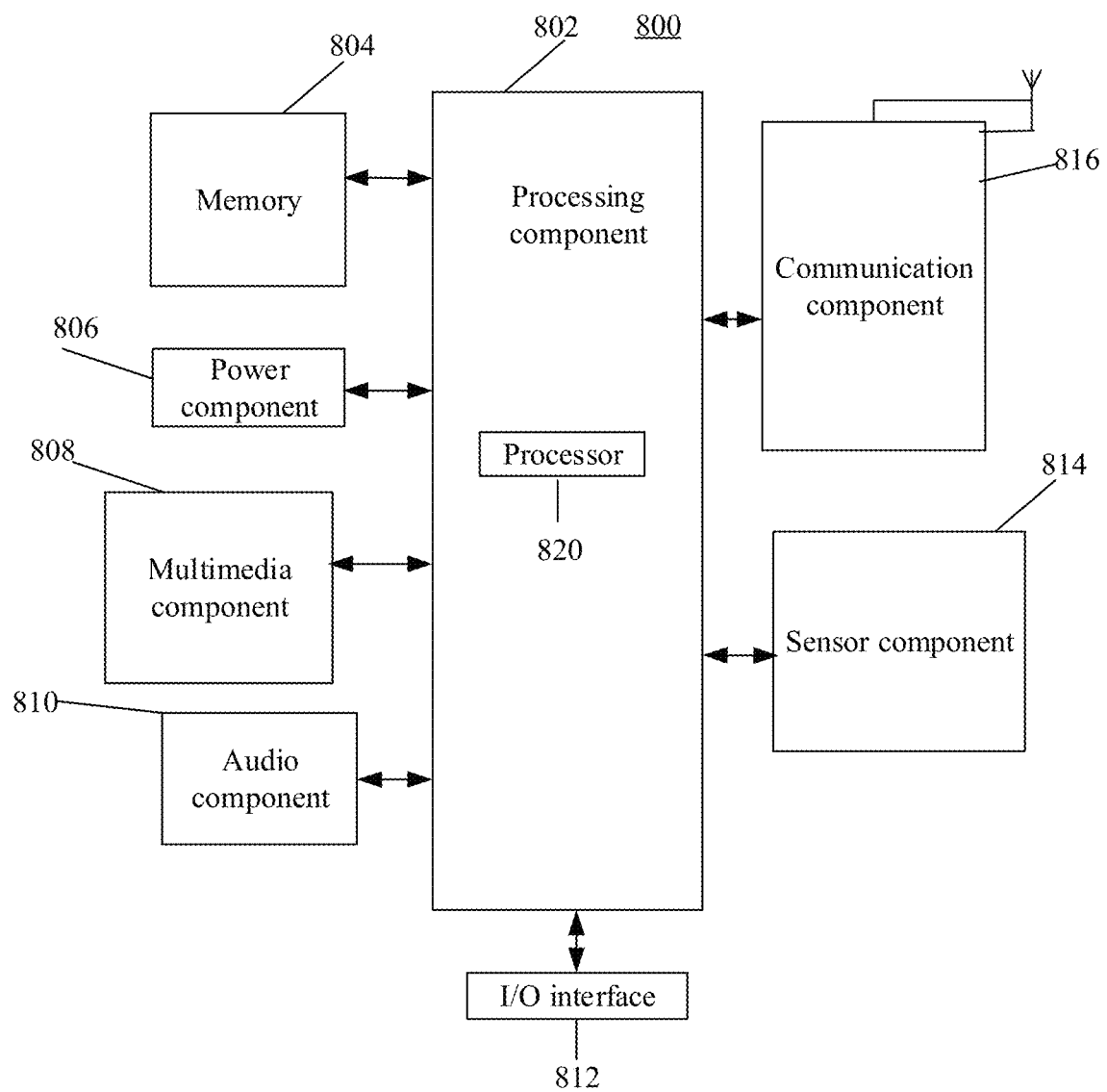
FIG. 8 is a block diagram of another device for wireless charging, according to some embodiments of the present disclosure.

FIG. 8 is a block diagram of a wireless charging transmitter 800, according to some embodiments of the present disclosure. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the blocks in the abovementioned method. Moreover, the processing component 802 may include one or more portions which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and orientations on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but is not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

In some embodiments, the position-orientation information can be detected with one or more sensors of the terminal such as the smart phone. The one or more sensors can include, for example, a gyroscopic sensor configured to detect orientation or attitude information of the terminal, which can be micro-electromechanical system (MEMS) sensors. The one or more sensors can include, for example, a radio frequency (RF) sensor configured to detect position information of the terminal based on the RF signal environment of the terminal, such as through signal strength and/or triangulation.

In some embodiments, the position-orientation information can be detected with one or more cameras of the wireless charging system.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 816 receives a broadcast signal or broadcast associated information from an external broadcast management system through a broadcast channel. In some embodiments of the present disclosure, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Compact Disc Read-Only Memory (CD-ROM), a magnetic tape, a floppy disc, an optical data storage device and the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer.

Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for wireless charging, applied to a wireless charging transmitter and comprising:
    acquiring position-orientation information of a terminal for wireless charging based on a radio frequency signal transmitted by the wireless charging transmitter;
    determining, based on the position-orientation information, whether the terminal is in a target charging state;
    responsive to determining that the terminal is not in the target charging state, outputting first prompting information, wherein the first prompting information is used to prompt an adjustment of the position-orientation information of the terminal;
    receiving first receiving power returned by the terminal based on first transmitting power, wherein the first transmitting power is power at which the radio frequency signal is transmitted by the wireless charging transmitter;
    determining first transmission efficiency based on the first transmitting power and the first receiving power; and
    responsive to determining that a difference between the first transmission efficiency and a maximum charging efficiency is less than a first threshold value, determining that the terminal is in the target charging state;
    wherein the first transmission efficiency is calculated based on $$\eta_{T-R} = \frac{G_t G_r \lambda^2}{(4\pi D)^2} \times L_t \times G_r(\theta_r, \varphi_r),$$

wherein $G_t$ is a transmitting gain of the wireless charging transmitter, $G_r$ is a receiving gain of the terminal, $\lambda$ is a wavelength, D is a transmission distance, the transmission distance is a distance between the wireless charging transmitter and the terminal, $L_t$ is joint loss of wireless connection, and $G_r(\theta_r, \varphi_r)$ is loss produced by an alignment error of a receiving node.

2. The method of claim 1, wherein the determining, based on the position-orientation information, whether the terminal is in the target charging state comprises:
    determining, based on predetermined correspondences between position-orientations of the terminal and charging efficiency, charging efficiency corresponding to the position-orientation information;
    responsive to the charging efficiency being within a preset charging efficiency range, determining that the terminal is in the target charging state; and
    responsive to the charging efficiency being outside the preset charging efficiency range, determining that the terminal is not in the target charging state.

3. The method of claim 2, wherein the responsive to that the charging efficiency being within a preset charging efficiency range, determining that the terminal is in the target charging state comprises:
    responsive to the charging efficiency being maximum charging efficiency in the correspondences, determining that the terminal is in the target charging state.

4. The method of claim 2, further comprising:
    responsive to determining that the terminal is not in the target charging state, outputting second prompting information based on the position-orientation information and a position-orientation of the terminal corresponding to charging efficiency within the preset charging efficiency range, and
    wherein the second prompting information is used to prompt an adjustment parameter for adjusting the position-orientation of the terminal, and the adjustment parameter comprises at least one of: a direction in which a position of the terminal is adjusted, a distance by which the position of the terminal is adjusted or an orientation of the terminal.

5. The method of claim 1, further comprising:
    responsive to determining that the terminal is in the target charging state, outputting second prompting information, wherein the second prompting information is used to prompt that the terminal is in the target charging state.

6. The method of claim 1, wherein the position-orientation information comprises at least one of position information or orientation information.

7. The method of claim 6, wherein the position information represents a distance between the terminal and the wireless charging transmitter, or a space distribution of the terminal.

8. The method of claim 6, wherein the orientation information represents that the terminal is lying flat, vertical or at an angle with respect to the horizontal plane, or is orientation information or direction information of the terminal.

9. A device for wireless charging, comprising:
    a processor; and
    memory storing instructions for execution by the processor;
    wherein the processor is configured to:
    acquire position-orientation information of a terminal for wireless charging based on a radio frequency signal transmitted by a wireless charging transmitter;
    determine, based on the position-orientation information, whether the terminal is in a target charging state;
    responsive to determining that the terminal is not in the target charging state, output first prompting information, wherein the first prompting information is used to prompt an adjustment of the position-orientation information of the terminal;
receive first receiving power returned by the terminal based on first transmitting power, wherein the first transmitting power is power at which the radio frequency signal is transmitted by the wireless charging transmitter;
determine first transmission efficiency based on the first transmitting power and the first receiving power; and
responsive to determining that a difference between the first transmission efficiency and a maximum charging efficiency is less than a first threshold value, determine that the terminal is in the target charging state;
wherein the first transmission efficiency is calculated based on $$\eta_{T-R} = \frac{G_t G_r \lambda^2}{(4\pi D)^2} \times L_t \times G_r(\theta_r \varphi_r),$$

wherein $G_t$ is a transmitting gain of the wireless charging transmitter, $G_r$ is a receiving gain of the terminal, $\lambda$ is a wavelength, D is a transmission distance, the transmission distance is a distance between the wireless charging transmitter and the terminal, $L_t$ is joint loss of wireless connection, and $G_r(\theta_r \varphi_r)$ is loss produced by an alignment error of a receiving node.

10. The device of claim 9, wherein the processor is configured to:
determine, based on predetermined correspondences between position-orientations of the terminal and charging efficiency, charging efficiency corresponding to the position-orientation information; and
responsive to the charging efficiency being within a preset charging efficiency range, determine that the terminal is in the target charging state and, responsive to the charging efficiency being outside of the preset charging efficiency range, determine that the terminal is not in the target charging state.

11. The device of claim 10, wherein the processor is configured to: responsive to the charging efficiency being maximum charging efficiency in the correspondences, determine that the terminal is in the target charging state.

12. The device of claim 10, wherein the processor is further configured to, responsive to determining that the terminal is not in the target charging state, output second prompting information based on the position-orientation information and a position-orientation of the terminal corresponding to charging efficiency within the preset charging efficiency range, and
wherein the second prompting information is used to prompt an adjustment parameter for adjusting the position-orientation of the terminal, and the adjustment parameter comprises at least one parameter of: a direction in which a position of the terminal is adjusted, a distance by which the position of the terminal is adjusted or an orientation of the terminal.

13. The device of claim 9, wherein the processor is configured to, responsive to determining that the terminal is in the target charging state, output second prompting information, wherein the second prompting information is used to prompt that the terminal is in the target charging state.

14. The device of claim 9, wherein the position-orientation information comprises position information representing a distance between the terminal and the wireless charging transmitter, or a space distribution of the terminal.

15. The device of claim 9, wherein the position-orientation information comprises orientation information representing that the terminal is lying flat, vertical or at an angle with respect to the horizontal plane, or is orientation information or direction information of the terminal.

16. A non-transitory computer-readable storage medium having stored therein an executable program that when executed by a processor, implement a method for wireless charging, and the method comprising:
acquiring position-orientation information of a terminal for wireless charging based on a radio frequency signal transmitted by the wireless charging transmitter;
determining, based on the position-orientation information, whether the terminal is in a target charging state;
responsive to determining that the terminal is not in the target charging state, outputting first prompting information, wherein the first prompting information is used to prompt an adjustment of the position-orientation information of the terminal;
receiving first receiving power returned by the terminal based on first transmitting power, wherein the first transmitting power is power at which the radio frequency signal is transmitted by the wireless charging transmitter;
determining first transmission efficiency based on the first transmitting power and the first receiving power; and
responsive to determining that a difference between the first transmission efficiency and a maximum charging efficiency is less than a first threshold value, determining that the terminal is in the target charging state;
wherein the first transmission efficiency is calculated based on $$\eta_{T-R} = \frac{G_t G_r \lambda^2}{(4\pi D)^2} \times L_t \times G_r(\theta_r \varphi_r),$$

wherein $G_t$ is a transmitting gain of the wireless charging transmitter, $G_r$ is a receiving gain of the terminal, $\lambda$ is a wavelength, D is a transmission distance, the transmission distance is a distance between the wireless charging transmitter and the terminal, $L_t$ is joint loss of wireless connection, and $G_r(\theta_r \varphi_r)$ is loss produced by an alignment error of a receiving node.

17. The non-transitory computer-readable storage medium of claim 16, wherein the determining, based on the position-orientation information, whether the terminal is in the target charging state comprises:
determining, based on predetermined correspondences between position-orientations of the terminal and charging efficiency, charging efficiency corresponding to the position-orientation information;
responsive to determining that the charging efficiency is within a preset charging efficiency range, determining that the terminal is in the target charging state; and
responsive to determining that the charging efficiency is outside the preset charging efficiency range, determining that the terminal is not in the target charging state.

* * * * *